(12) United States Patent
Owada et al.

(10) Patent No.: US 10,860,344 B2
(45) Date of Patent: Dec. 8, 2020

(54) REMOTE OPERATING SYSTEM

(71) Applicant: Biclick Co., Ltd., Tokyo (JP)

(72) Inventors: Masato Owada, Tokyo (JP); Kengo Tanaka, Tokyo (JP)

(73) Assignee: BICLICK CO., LTD., Tokyo (JP)

( * ) Notice: Subject to any disclaimer, the term of this patent is extended or adjusted under 35 U.S.C. 154(b) by 0 days.

(21) Appl. No.: 16/307,120

(22) PCT Filed: Feb. 27, 2018

(86) PCT No.: PCT/JP2018/007290
§ 371 (c)(1),
(2) Date: Dec. 4, 2018

(87) PCT Pub. No.: WO2018/159620
PCT Pub. Date: Sep. 7, 2018

(65) Prior Publication Data
US 2019/0227821 A1    Jul. 25, 2019

(30) Foreign Application Priority Data
Feb. 28, 2017   (JP) ................................. 2017-037485

(51) Int. Cl.
*G06F 9/451*     (2018.01)
*H04L 29/08*     (2006.01)
(Continued)

(52) U.S. Cl.
CPC ............ *G06F 9/452* (2018.02); *G06F 3/0484* (2013.01); *G06F 3/1454* (2013.01);
(Continued)

(58) Field of Classification Search
CPC ...................................................... G06F 9/452
See application file for complete search history.

(56) References Cited

U.S. PATENT DOCUMENTS

2011/0145863 A1* 6/2011 Alsina .................. G06F 3/0482
725/44
2016/0300392 A1* 10/2016 Jonczyk ................ G06T 19/003
(Continued)

FOREIGN PATENT DOCUMENTS

CN      106255991     12/2016
JP      2009-239506   10/2009
(Continued)

OTHER PUBLICATIONS

International Search Report, dated Apr. 10, 2018 (Apr. 10, 2018).
Taiwanese Office Action dated Jun. 9, 2020, 8 pages.

*Primary Examiner* — Abdullah Al Kawsar
*Assistant Examiner* — David V Luu
(74) *Attorney, Agent, or Firm* — Rankin, Hill & Clark LLP

(57) ABSTRACT

Provided is a remote operating system which enables to operate a device by a remote operating device in a simple and reliable manner even if the device to be operated is not equipped with a communication function, or if displayed contents on a monitor screen of the device to be operated are not recognized by the remote operating device. A remote operating system (100) includes: a screen acquisition unit (121); an image determination unit (122); a state providing unit (123); an operation reception unit (131); an operating signal output unit (132); a correct or incorrect operation determination unit (133); and a state database DB. The remote operating system (100) further includes a capture device (141) for capturing an image of a monitor X1 of a device X of interest, and a control interface (142) connected to a keyboard X2 of the object X to be controlled in a superimposed manner.

5 Claims, 3 Drawing Sheets

(51) Int. Cl.
*G06F 3/14* (2006.01)
*H04Q 9/00* (2006.01)
*H04M 11/00* (2006.01)
*G06F 3/0484* (2013.01)

(52) U.S. Cl.
CPC ........... *H04L 67/125* (2013.01); *H04M 11/00* (2013.01); *H04Q 9/00* (2013.01)

(56) References Cited

U.S. PATENT DOCUMENTS

2017/0093932 A1* 3/2017 Fukushima ......... H04M 3/5191
2018/0197103 A1* 7/2018 Petursson .............. G06N 20/00

FOREIGN PATENT DOCUMENTS

| JP | 2011-120131 | 6/2011 |
| JP | 2013-062778 | 4/2013 |
| JP | 2015-019256 | 1/2015 |

\* cited by examiner

REMOTE OPERATING SYSTEM

TECHNICAL FIELD

The present invention relates to a remote operating system remotely operating a device to be operated by a remote operating device based on a state of a monitor screen of the device to be operated.

BACKGROUND ART

Conventionally there is known, as a remote operating system of this kind, a system in which a device to be operated is configured to enable communication with a remote operating device, and in which an operation screen of the device to be operated is displayed on the remote operating device side to allow a remote operation to be received, as described in Patent Literature 1 shown below.

CITATION LIST

Patent Literature

Patent Literature 1: JP 2013-62778 A

SUMMARY OF INVENTION

Technical Problem

However, in such a conventional remote operating system, in a case where the device to be operated is not equipped with a communication function, or in which the monitor screen of the device to be operated merely displays contents (for example, display of an analog screen) and is not recognized on the remote operating device side, there is a problem that it is difficult to operate the device to be operated by the remote operating device.

In consideration of the above problem, an object of the present invention is to provide a remote operating system enabling a device to be operated to be operated by a remote operating device in a simple and reliable manner even in a case where the device to be operated is not equipped with a communication function, or in which displayed contents on a monitor screen of the device to be operated are not recognized on the remote operating device side.

Solution to Problem

According to a first aspect of the present invention, there is provided a remote operating system remotely operating a device to be operated by a remote operating device based on a state of a monitor screen of the device to be operated, including:

a screen acquisition unit configured to capture the monitor screen of the device to be operated via a capture device and acquiring the monitor screen as an image;

an image determination unit configured to determine a state of the image from the image acquired by the screen acquisition unit;

a state providing unit configured to provide the remote operating device with the state determined by the image determination unit;

an operation reception unit configured to receive an operation from the remote operating device; and an operating signal output unit configured to convert the operation received by the operation reception unit into an operating signal for the device to be operated and outputting the operating signal to the device to be operated via a control interface, wherein the image determination unit determines whether the state of the image is in an image state that is operable by the device to be operated from the image acquired by the screen acquisition unit, and in a case where the state of the image is the image state that is operable by the device to be operated, the state providing unit generates an operation input screen corresponding to the operable image state and provides the operation input screen to the remote operating device.

With the remote operating system according to the first aspect of the present invention, the screen acquisition unit captures the monitor screen of the device to be operated and acquires the monitor screen as the image. Accordingly, even in a case where the monitor screen of the device to be operated merely displays an analog screen, information on the monitor screen can be provided to the remote operating device.

While various images are displayed on the monitor screen, the image determination unit determines the state of the capture image acquired by the screen acquisition unit in advance, and the state of the image is provided to the remote operating device. Accordingly, screen information appropriate for remote operation can be provided to the remote operating device.

Also, with the remote operating system according to the first aspect of the present invention, the operation in the remote operating device received by the operation reception unit is converted into the operating signal for the device to be operated and is output to the device to be operated. Accordingly, even in a case where the device to be operated is not equipped with a communication function, the device to be operated can be operated directly by the operating signal.

In this manner, with the remote operating system according to the first aspect of the present invention, even in a case where the device to be operated is not equipped with a communication function, or in which displayed contents on the monitor screen of the device to be operated are not recognized on the remote operating device side, the device to be operated can be operated by the remote operating device in a simple and reliable manner.

Meanwhile, in the remote operating system according to the first aspect of the present invention, the capture of the monitor screen includes not only capture by hardware using the capture device but also capture by software using a remote desktop.

Also, with the remote operating system according to the first aspect of the present invention, the image determination unit determines whether the state of the image acquired from the screen acquisition unit is an image state that is operable by the device to be operated. In a case where the state of the image is the image state that is operable by the device to be operated, the state providing unit generates an operation input screen corresponding to the operable image state and provides the screen to the remote operating device. Accordingly, the operation input screen appropriate for remote operation can be provided to the remote operating device.

In this manner, with the remote operating system according to the first aspect of the present invention, even in a case where the device to be operated is not equipped with a communication function, or in which displayed contents on the monitor screen of the device to be operated are not recognized on the remote operating device side, the device to be operated can be operated by the remote operating device in a simple and reliable manner through the operation input screen appropriate for remote operation.

As the remote operating system according to a second aspect of the present invention in the remote operating system according to the first aspect of the present invention, the operating signal output unit is connected to a human interface (for example, a keyboard) of the device to be operated in a superimposed manner, converts the operation received by the operation reception unit into the operating signal for the device to be operated as an emulation signal for the human interface, and outputs the operating signal to the device to be operated.

With the remote operating system according to the second aspect of the present invention, the operating signal output unit converts the operation received by the operation reception unit into the operating signal for the device to be operated as the emulation signal for the human interface of the device to be operated and outputs the operating signal to the device to be operated.

Thus, with the remote operating system according to the second aspect of the present invention, even in a case where the device to be operated is not equipped with a communication function or does not have an external connection input, the device to be operated can be operated by the remote operating device in a simple and reliable manner.

The remote operating system according to a third aspect of the present invention in the remote operating system according to the first or second aspect of the present invention includes a correct or incorrect operation determination unit configured to determine whether the operation is correct or incorrect based on the state of the image acquired via the screen acquisition unit after the operating signal output unit outputs the operating signal to the device to be operated.

With the remote operating system according to the third aspect of the present invention, the correct or incorrect operation determination unit determines whether the operation is correct or incorrect based on the state of the image acquired via the screen acquisition unit after the operating signal output unit outputs the operating signal to the device to be operated. Thus, it is possible to confirm based on a change of the state of the device to be operated if the remote operation has been executed reliably.

In this manner, with the remote operating system according to the third aspect of the present invention, even in a case where the device to be operated is not equipped with a communication function, or in which a display content on the monitor screen of the device to be operated is not recognized on the side of the remote operating device, the device to be operated can be operated by the remote operating device in a simple and reliable manner, and execution of the operation can be confirmed.

DESCRIPTION OF EMBODIMENTS

Figure 1:
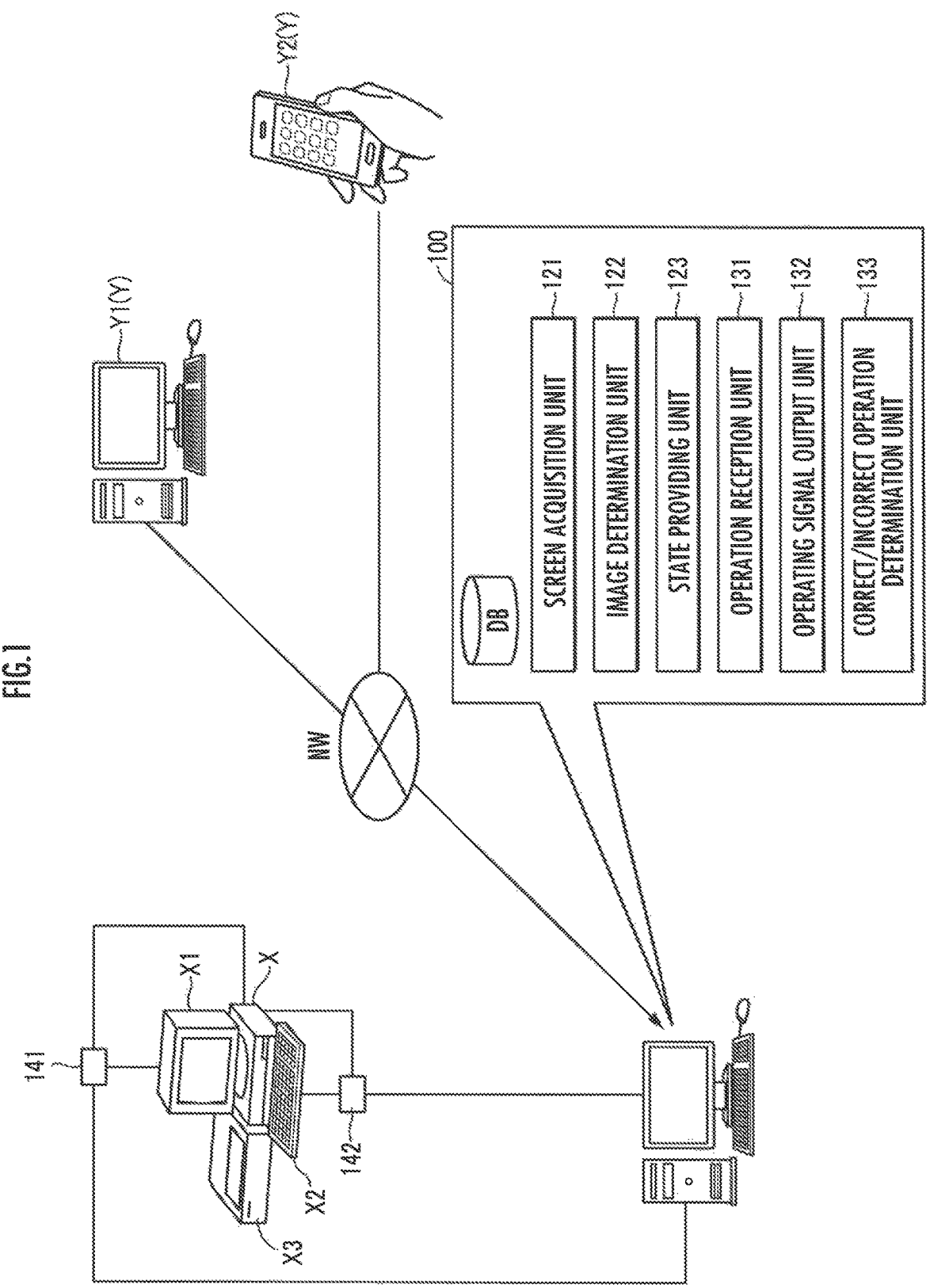
FIG. 1 is a system configuration diagram illustrating an overview of a remote operating system according to an embodiment.

As illustrated in FIG. 1, a remote operating system 100 according to an embodiment is a remote operating system in which, even in a case where a device X to be operated serving as a device to be operated is not equipped with a communication function or does not have an external connection interface, or in which a screen displayed on a monitor X1 of the device X to be operated is an analog screen, the device X to be operated is remotely operated by a remote operating device Y based on a state of the screen on the monitor X1 of the device X to be operated.

The remote operating system 100 includes a screen acquisition unit 121, an image determination unit 122, a state providing unit 123, an operation reception unit 131, an operating signal output unit 132, a correct or incorrect operation determination unit 133, and a state database DB.

The remote operating system 100 also includes a capture device 141 capturing an image of the monitor X1 of the device X to be operated and a control interface 142 connected to a keyboard X2 serving as a human interface of the object X to be controlled in a superimposed manner.

Meanwhile, the screen of the monitor X1 of the device X to be operated is a screen of a computer, for example, at a front desk of an accommodation facility, serving as the device X to be operated. On the screen, for example, "Occupied," "Unoccupied," "Cleaning," "Reserved," and the like are displayed and color-coded at regions divided based on the rooms.

The screen acquisition unit 121 captures and acquires an image of the screen on the monitor X1 via the capture device 141. The capture device 141 outputs to the remote operating system 100 image data acquired by sampling an analog screen signal of a monitor cable (VGA cable) connecting the front computer X to the monitor X1 at a constant frequency.

For example, the capture device 141 may be a VGA video capture board or may have a function of a VGA distribution cable as well as a function of the video capture board. Also, the function of the capture device 141 is not limited to video capturing from the VGA cable, and the capture device 141 may be a video capture board capturing a video through a video (an S-Video type or a composite type) input/output cable, a DVI capture board for digital display, an SDI capture board for a video for business purposes or for a security camera, an HDMI (registered trademark) capture board for general video devices, or the like.

The image determination unit 122 determines a state of the image from the image acquired from the screen acquisition unit 121. Meanwhile, the image determination unit 122 determines the state of the image acquired from the screen acquisition unit 121 after performing filter processing to the image as needed. The filter processing is RGBA conversion, for example, in which a capture image is converted into an image having a specified color number. It is to be noted that the filter processing may be PING conversion or the like having a smaller color number instead of the RGBA conversion.

Specifically, the e image determination unit 122 determines whether the state of the image acquired from the screen acquisition unit 121 is a screen state that is operable by the device X to be operated.

The state providing unit 123 provides the remote operating device Y with the state of the screen of the device X to be operated determined by the image determination unit.

Specifically, in a case where, as a result of the determination by the image determination unit 122, the state of the image of the device X to be operated is an image state that is operable by the device X to be operated, the state providing unit 123 generates an operation input screen corresponding to the operable image state and provides the screen to the remote operating device Y.

The components 121 to 123 in the remote operating system 100, which determine a state of an image on the monitor X1 of the device X to be operated and provide the state to the external remote operating device Y, have been described above.

The operation reception unit 131 receives an operation from the remote operating device Y in the remote operating system 100. It is to be noted that the remote operating device Y may be a personal computer Y1 or a smartphone Y2 as long as the remote operating device Y is an external operating device connected via a network NW such as the Internet.

The operating signal output unit 132 converts the operation in the remote operating device Y received by the operation reception unit 131 into an operating signal for the device X to be operated and outputs the signal to the device X to be operated.

More specifically, the operating signal output unit 132 outputs the signal to the control interface 142 so that the operation received by the operation reception unit 131 becomes an emulation signal for the keyboard X2 of the device X to be operated via the control interface 142 connected to the keyboard X2 of the device X to be operated in a superimposed manner.

After the operating signal output unit 132 outputs the operating signal to the device X to be operated, the correct or incorrect operation determination unit 133 determines whether the operation is correct or incorrect based on a state of an image acquired via the screen acquisition unit 121.

The components 131 to 133 in the remote operating system 100, which operate the device X to be operated by the operation from the remote operating device Y, have been described above.

Also, in the remote operating system 100, the state of the image determined by the image determination unit 122 and the correct or incorrect operation determined by the correct or incorrect operation determination unit 133 are stored in the state database DB.

The configuration of the remote operating system 100 has been described above. For example, the remote operating system 100 is constituted by hardware such as a CPU (Central Processing Unit), a ROM (Read Only Memory), and a RAM (Random Access Memory), stores programs that execute processing by the above processing means 121 to 123, 131 to 133, and DB in a memory (not illustrated), and executes the programs to function as a computing device (sequencer) configured to execute the above control processing.

Figure 2:
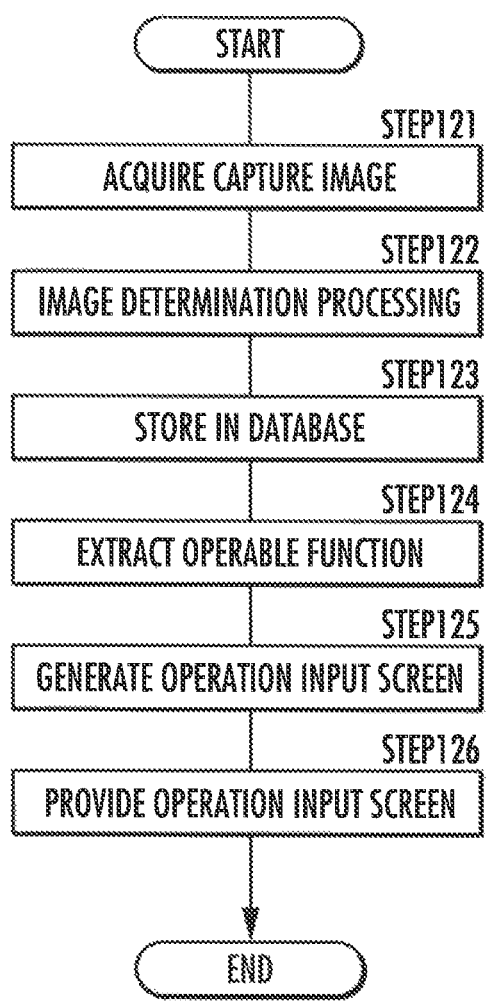
FIG. 2 is a flowchart illustrating a processing content in the remote operating system in FIG. 1.

Next, referring to FIG. 2, described is a processing for determining a state of an image on the monitor X1 of the device X to be operated and providing the state to the external remote operating device Y in the remote operating system 100.

First, the remote operating system 100 acquires an image obtained by capturing a screen on the monitor X1 (actually, an image captured at a constant frequency) via the capture device 141 by the screen acquisition unit 121 (STEP 121 in FIG. 2).

Subsequently, the remote operating system 100 determines whether a state of the capture image acquired in STEP 121 is a screen state that is operable by the device X to be operated by the image determination unit 122 (STEP 122 in FIG. 2).

As a specific determination method, various methods can be employed. For example, the remote operating system 100 acquires color information at a specified point on the image and determines a state of the image on the screen of the monitor X1 of the device X to be operated (whether the state is an image state that is operable by the device X to be operated, and in a case where the state is the operable image state, how the image state is) based on combination of colors of the acquired color information (RGB data).

Also, as another determination method, for example, a state of the image on the screen of the monitor X1 of the device X to be operated may be determined by recognizing characters (including character strings) displayed on the image by OCR (optical character recognition).

Further, to improve determination accuracy, a state of the image on the screen of the monitor X1 of the device X to be operated may be determined based on combination of the color information on the image and the characters recognized by the OCR (optical character recognition).

Hence, for example, in a case where the device X to be operated is a front computer in an accommodation facility, at the time of capturing the image on the monitor X1, the remote operating system 100 determines that the image on which "Occupied," "Unoccupied," "Cleaning," "Reserved," and the like are displayed and color-coded at regions divided based on the rooms is in an operable state and is in a state where a reservation for an unoccupied room is receivable.

The remote operating system 100 then stores a result determined by the image determination unit 122 in the state database DB (STEP 123 in FIG. 2).

Subsequently, the state providing unit 123 extracts an operable function based on the state of the image on the screen of the monitor X1 of the device X to be operated determined by the image determination unit 122 (determination result read from the state database DB) (STEP 124 in FIG. 2).

Specifically, the state providing unit 123 refers to a state table in which determination results and operable functions are listed in a matrix form to extract an operable function corresponding to the determination result by the image determination unit 122.

Subsequently, the state providing unit 123 generates an operation input screen (STEP 125 in FIG. 2).

Specifically, the state providing unit 123 generates the operation input screen corresponding to the operable function extracted in STEP 124.

Here, the operation input screen is a screen that can be displayed by output to a browser in HTML or with use of a dedicated application. For example, in a case where the device X to be operated is a front computer in an accommodation facility, an operation input screen in which reservation buttons are displayed only at unoccupied room numbers is generated.

The operation input screen is generated not as a screen simply listing the operable functions but as a screen providing only necessary functions in accordance with additional conditions.

Examples of the additional conditions are a condition in which, when the number of unoccupied rooms is three or less, reservation buttons serving as reservation receiving functions are not displayed to stop receiving reservations, and a condition in which, during a specified period of time (2 to 5 a.m.), reservation buttons serving as reservation receiving functions are not displayed to stop receiving reservations during the period.

Subsequently, the state providing unit 123 provides the operation input screen generated in STEP 125 via the network NW to the remote operating device Y (STEP 126 in FIG. 2).

The above describes the processing for determining a state of an image on the monitor X1 of the device X to be operated and providing the state to the external remote operating device Y in the remote operating system 100. According to the processing, even in a case where the screen of the monitor X1 of the device X to be operated merely displays an analog screen, information on the screen of the monitor X1 can be provided to the remote operating device.

Also, while various images are displayed on the screen of the monitor X1, the image determination unit 122 determines in advance, a state of a capture image acquired by the screen acquisition unit 121, and the state providing unit 123 generates an operation input screen corresponding to the state of the image and provides the operation input screen to the remote operating device Y. Accordingly, screen information appropriate for remote operation can be provided to the remote operating device Y.

Meanwhile, as for the timing to generate the operation input screen by the state providing unit 123, the operation input screen may be generated at regular intervals, or a change of an image state may be monitored at regular processing cycles, and the operation input screen may be generated at a timing when the image state changes.

Also, the timing to generate the operation input screen by the state providing unit 123 may be a timing when the remote operating device Y accesses the remote operating system 100 or a timing when the remote operating device Y requests operation of the device X to be operated. In this case, the state providing unit 123 preferably provides the generated operation input screen only to the remote operating device Y that has accessed the remote operating system 100 or the remote operating device Y that has requested the operation.

Figure 3:
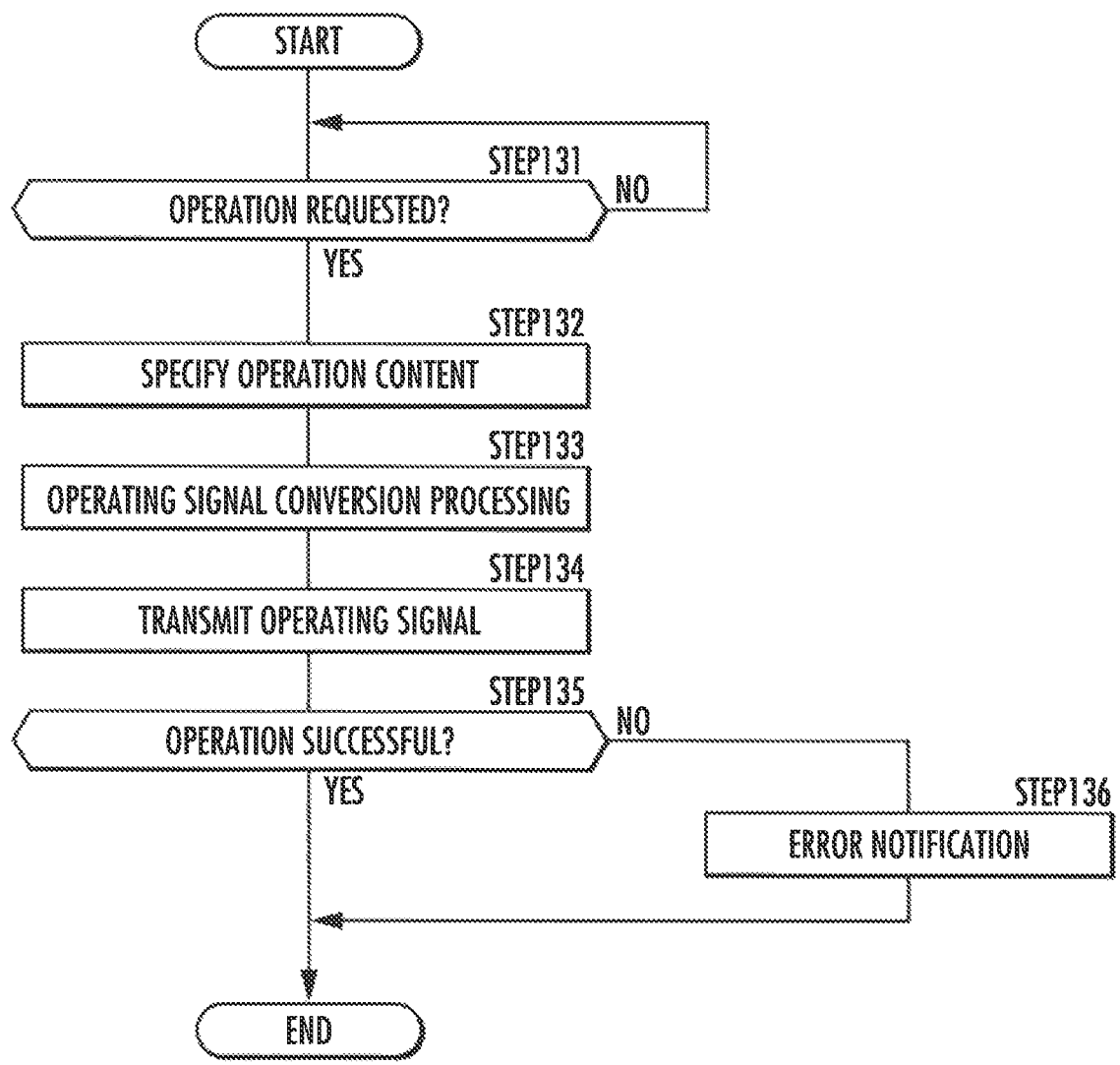
FIG. 3 is a flowchart illustrating a processing content in the remote operating system in FIG. 1.

Next, referring to FIG. 3, described is a processing for operating the device X to be operated by the operation in the remote operating device Y in the remote operating system 100.

As a prerequisite, as described above, when the state of the image on the monitor X1 of the device X to be operated is determined, and the operation input screen corresponding to the content is provided to the external remote operating device Y, a user of the remote operating device Y decides the operation content for the device X to be operated while he/she is looking at the operation input screen.

At this time, the remote operating system 100 monitors whether or not there is an operation request from the remote operating device Y at regular processing cycles by the operation reception unit 131 (STEP 131 in 3).

In a case where there is an operation request from the remote operating device Y (YES in STEP 131 in FIG. 3), the operation reception unit 131 specifies the operation content (STEP 132 in FIG. 3). Conversely, in a case where there is no operation request from the remote operating device Y (NO in STEP 131 in FIG. 3), the operation reception unit 131 repetitively executes the monitoring until there is an operation request.

Specifying the operation content is performed by specifying the operation content on the operation input screen. More specifically, specifying the operation content is performed by use of a URL parameter transmitted from the remote operating device Y to the remote operating system 100.

For example, in a case where the device X to be operated is a front computer in an accommodation facility, and in which a reservation operation for room 101, which is unoccupied, is performed in the remote operating device Y, the operation of the reservation button for room 101 is specified by use of a URL parameter of [http://server address/yoyaku (operation command)?room (targeted unoccupied room)=101].

Subsequently, the operating signal output unit 132 converts the operation content specified in STEP 132 into an operating signal for the device X to be operated (STEP 133 in FIG. 3).

Specifically, converting into the operating signal is executed by converting the operation content into a control signal (execution command) for the control interface 142 corresponding to the operation content so that the operation received by the operation reception unit 131 may be an emulation signal for the keyboard X2 of the device X to be operated via the control interface 142 connected to the keyboard X2 of the device X to be operated in a superimposed manner.

Here, a control signal (execution command) causing a delay (delay time) that is likely to be generated when a person operates the keyboard X2 is inserted as needed into the control signal (execution command) to the control interface 142.

Subsequently, the operating signal output unit transmits the operating signal for the device X to be operated converted in STEP 133 to the control interface (STEP 134 in FIG. 3).

The control interface 142 thus converts the control signal (execution command) into a control signal (operation code) that the device X to be operated can recognize and outputs the control signal (operation code) to the device X to be operated. Similarly, a control signal (execution command) causing a delay (delay time) that is likely to be generated when a person operates the keyboard X2 is inserted as needed into the control signal (operation code).

For example, in a case where the device X to be operated is a front computer in an accommodation facility, and in which a reservation operation for room 101, which is unoccupied, is performed in the remote operating device Y, a control signal (operation code) corresponding to a key operation for room number 101 on the keyboard X2, that is, a reservation key operation, is generated in the form of containing a control signal (execution command) causing a delay (delay time) and is output to the device X to be operated.

Meanwhile, in the present embodiment, although a case where the control signal (operation code) that the device X to be operated can recognize is generated via the control interface is described, the converted control signal (operation code) may be output directly by the operating signal output unit 132 of the remote operating system 100.

The above describe the processing for operating the device X to be operated by operation in the remote operating device Y in the remote operating system 100. In addition to the processing, correct or incorrect operation determination processing is preferably performed by the correct or incorrect operation determination unit 133 (STEPS 135 to 136 in FIG. 3).

Specifically, after the operating signal is output to the device X to be operated by the operating signal output unit 132 (actually, after a predetermined period of time has passed based on a counter timer or the like), the correct or incorrect operation determination unit 133 determines whether the operation is successful based on a state of an image acquired via the screen acquisition unit 121 (STEP 135 in FIG. 3).

Here, in the analysis of the state of the image acquired via the screen acquisition unit 121, in a similar manner to the processing of the image determination unit 122 (refer to STEP 122 in FIG. 2), in a case where there is a change of the state of the image that is operable by the device X to be operated corresponding to the operation content, the correct or incorrect operation determination unit 133 determines that the operation is successful (YES in STEP 135 in FIG. 3) and ends the sequential processing.

Conversely, in a case where there is no change of the state of the image that is operable by the device X to be operated corresponding to the operation content, the correct or incorrect operation determination unit 133 determines that the operation is not successful (NO in STEP 135 in FIG. 3), notifies the remote operating device Y of an error (STEP 136 in FIG. 3), and ends the sequential processing.

Meanwhile, instead of the error notification, (the processing may return to STEP 134, and) the operating signal output unit 132 may transmit the operating signal again (refer to STEP 134).

Also, the determination result (image state) by the correct or incorrect operation determination unit 133 is preferably (overwritten and) stored in the state database DB.

The above describe the processing for operating the device X to be operated by the operation by the remote operating device Y in the remote operating system 100 and processing for determining whether the operation is correct or incorrect.

In the processing, the operation in the remote operating device Y received by the operation reception unit 131 is converted into the operating signal for the device X to be operated and is output to the device X to be operated. Accordingly, even in a case where the device X to be operated is not equipped with a communication function, the device X to be operated can be operated directly by the operating signal.

Also, since the correct or incorrect operation determination unit 133 performs the correct or incorrect operation determination based on a change of a state of the device X to be operated, it is possible to confirm if the remote operation has been executed reliably.

In this manner, with the remote operating system according to the present embodiment, even in a case where the device X to be operated is not equipped with a communication function, or in which a display content on the screen of the monitor X1 of the device X to be operated is not recognized on the side of the remote operating device Y, the device X to be operated can be operated by the remote operating device Y in a simple and reliable manner, and execution of the operation can be confirmed.

Meanwhile, in the present embodiment, a case where capture of the monitor screen is capture by hardware using the capture device 141 has been described. However, the capture is not limited to this and may be capture by software using a remote desktop.

Also, in the present embodiment, a case where the keyboard. X2 is emulated as a human interface of the object X to be controlled has been described. However, the human interface is not limited to this and may be any human interface such as a mouse, a trackball, and a mechanical push button as long as the human interface enables a person to perform input and can be emulated.

Further, in the present embodiment, a case where a personal computer is operated as the device X to be operated has been described. However, the device X to be operated is not limited to this and may be a printer device X3 or the like connected to the personal computer.

REFERENCE SIGNS LIST

100: remote operating system, 121: screen acquisition unit, 122: image determination unit, 123: state providing unit, 131: operation reception unit, 132: operating signal output unit, 133: correct or incorrect operation determination unit, 141: capture device, 142: control interface, X: device to be operated, X1: monitor, X2: keyboard (human interface), X3: minter, Y: remote operating device, DB: state database, NW: network

The invention claimed is:

1. A remote operating system remotely operating a device to be operated by a remote operating device based on a state of a monitor screen of the device to be operated, the remote operating system comprising:
   a computing device;
   a capture device configured to capture the monitor screen of the device to be operated; and
   a control interface connected between the remote operating system and to a human interface of the device to be operated in a superimposed manner,
   wherein the remote operating system, the device to be operated, and the remote operating device are all separate from each other and, among the remote operating system, the device to be operated, and the remote operating device, only the remote operating system and the remote operating device are in communication with each other via a network,
   wherein the computing device comprises a processor and memory storing programs that when executed by the processor, configure the processor to perform the functions comprising:
   acquiring the monitor screen captured by the capture device as an image;
   determining a state of the image from the image acquired by the capture device;
   providing the remote operating device with the state determined;
   receiving an operation communicated to the computing device from the remote operating device; and
   converting the operation received from the remote operating device into an operating signal for the device to be operated as an emulation signal for the human interface, and to output the operating signal to the device to be operated via the control interface,
   wherein the determining further comprises determining from the image acquired whether the state of the image is in an image state that is operable by the device to be operated based on the operation communicated from the remote operating device, and in a case where the state of the image is the image state that is operable by the device to be operated, wherein the providing further generates an operation input screen corresponding to the operable image state and provides the operation input screen to the remote operating device,
   wherein the determining further determines whether the state of the image is in the image state that is operable by the device to be operated from the image acquired by: acquiring color information at a specified point on the image acquired; recognizing characters displayed on the image acquired; and determining the state of the color information and the characters.

2. The remote operating system according to claim 1, wherein the memory storing the programs that when executed by the processor, further configures the processor to perform the function comprising:
   determining whether the operation is correct or incorrect based on the state of the image acquired after the operating signal output unit outputs the operating signal to the device to be operated.

3. The remote operating system according to claim 1, wherein the capture device is a video capture board.

4. The remote operating system according to claim 3, wherein the human interface of the device to be operated is one of: a keyboard; a mouse; a trackball; and a mechanical push button.

5. The remote operating system according to claim 1, wherein the human interface of the device to be operated is one of: a keyboard; a mouse; a trackball; and a mechanical push button.

\* \* \* \* \*